(12) United States Patent
Nickel

(10) Patent No.: US 6,976,472 B2
(45) Date of Patent: Dec. 20, 2005

(54) IGNITION CIRCUIT FOR AN INTERNAL COMBUSTION ENGINE

(75) Inventor: Hans Nickel, Cottenweiler (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 10/891,011

(22) Filed: Jul. 15, 2004

(65) Prior Publication Data

US 2005/0011494 A1    Jan. 20, 2005

(30) Foreign Application Priority Data

Jul. 16, 2003 (DE) ............... 103 32 258

(51) Int. Cl.$^7$ ............... F02P 5/145; F02D 43/00
(52) U.S. Cl. ............... 123/406.25; 123/406.46; 123/406.47; 123/406.51
(58) Field of Search ............... 123/339.11, 406.24, 123/406.25, 406.46, 406.47, 406.5, 406.51, 123/406.52, 406.59

(56) References Cited

U.S. PATENT DOCUMENTS

| | | | |
|---|---|---|---|
| 4,612,899 A * | 9/1986 | Honjoh et al. ......... | 123/406.52 |
| 4,930,477 A * | 6/1990 | Nanyoshi et al. ...... | 123/406.51 |
| 5,447,131 A | 9/1995 | Nickel et al. | |
| 6,223,723 B1 * | 5/2001 | Ito ......................... | 123/406.51 |
| 2003/0033076 A1 | 2/2003 | Isoda et al. | |

FOREIGN PATENT DOCUMENTS

JP        60-256536        12/1985

* cited by examiner

Primary Examiner—Tony M. Argenbright
(74) Attorney, Agent, or Firm—Walter Ottesen

(57) ABSTRACT

An ignition circuit for a two-stroke engine has a spark plug connected via an ignition switch to a voltage source. The ignition switch is actuated via a control circuit to close the ignition switch in dependence upon the crankshaft angle and the rpm of the engine and to trigger an ignition spark per revolution of the crankshaft. For one and the same rpm, the control circuit makes available an ignition time point for the idle case and an ignition time point for the acceleration case. To achieve rapid acceleration from idle, the control circuit monitors idle rpm to switch to an ignition time point for the acceleration case for a pregiven rpm increase. If the control circuit determines an absence of the rpm increase or drop after ignition switchover to the acceleration case, then there is a switch back to the ignition time point for the idle case.

6 Claims, 1 Drawing Sheet

IGNITION CIRCUIT FOR AN INTERNAL COMBUSTION ENGINE

CROSS REFERENCE TO RELATED APPLICATION

This application claims priority of German patent application no. 103 32 258.2, filed Jul. 16, 2003, the entire content of which is incorporated herein by reference.

1. Field of the Invention

The invention relates to an ignition circuit for an internal combustion engine including a two-stroke engine in a portable handheld work apparatus such as a motor-driven chain saw, brushcutter, cutoff machine or the like.

2. Background of the Invention

Ignition circuits of this kind are known and include a control circuit which triggers the ignition spark in the combustion chamber and adjusts the ignition time point in dependence upon operating parameters of the engine. Mostly, a characteristic field is available for the control circuit for selecting an operation-adapted, optimal ignition time point.

During idle, different ignition conditions are present than under full load. For this reason, the ignition time point is adjusted corresponding to the idle state. If an idle closed control loop is provided, this ensures mostly a high rpm constancy in the idle range because the control circuit intervenes to control for the case of a decrease of the idle rpm as well as for the case of an increase of the idle rpm. It is here disadvantageous that an additional signal has to be inputted to the control circuit so that the acceleration state is detected and an rpm increase is permitted beyond the upper idle rpm limit. For this purpose, an idle switch can, for example, be used which is mounted on the throttle flap. When the throttle flap opens, the switch is also actuated and this signal is outputted to the control circuit so that the control circuit permits an rpm increase out of the idle rpm range.

SUMMARY OF THE INVENTION

It is an object of the invention to improve an ignition circuit for an internal combustion engine in such a manner that the control circuit permits, in case of an acceleration, a rapid rpm increase out of the idle range without additional means.

The ignition circuit of the invention is for an internal combustion engine including an engine in a portable handheld work apparatus, the engine having operating parameters and including a crankshaft which rotates through a crankshaft angle. The ignition circuit includes: a spark plug; a voltage source; an ignition switch connecting the spark plug to the voltage source; an electronic control circuit for actuating the ignition switch to close the same in dependence upon the crankshaft angle and at least one of the operating parameters and to trigger an ignition spark per revolution of the crankshaft; the control circuit functioning to make a first ignition time point available for an idle state and a second time point for an acceleration state at one and the same rpm of the engine; the control circuit functioning to monitor the idle rpm and switching over to the second time point for the acceleration state when there is an rpm increase during idle to thereby effect a rapid acceleration out of idle and, after the ignition switchover to the acceleration state, continuing to monitor the rpm and, when there is an absence of a further increase in rpm or when there is a drop in the rpm, the control circuit switching back to the first ignition time point for the idle state.

The invention makes use of the fact that the internal combustion engine (especially a two-stroke engine) does not combust during idle operation with each camshaft revolution. This physical fact is from the situation that, during idle, only small quantities of fresh air/fuel mixture are supplied and these quantities are not sufficient to adequately scavenge the combustion chamber. For this reason, after a combustion and a follow-up scavenging operation, the mixture in the combustion chamber still contains a high exhaust-gas component so that it is difficult to ignite or is not capable of igniting. No combustion takes place notwithstanding an ignition spark. The rpm of the engine falls off in the follow-on crankshaft revolution. For a two-stroke engine, it has been shown that, after a successful ignition and combustion, two to three crankshaft revolutions occur thereafter which are without combustion even though there is an ignition. Especially in the consideration of the rpm per crankshaft revolution, the idle rpm makes clear rpm jumps of up to, for example, 600 revolutions per minute.

According to the ignition circuit of the invention, the idle rpm per crankshaft revolution is monitored. If the control circuit determines an rpm increase during idle, then this is an indication for a successful ignition. Because of the rpm increase, the control circuit switches directly over to an ignition time point for the acceleration state so that the ignition time point for the acceleration state is set in the following crankshaft revolution.

After this switchover to the acceleration state, the rpm per crankshaft revolution is again evaluated in the next crankshaft revolution. If no further rpm increase is present, that is, the rpm has fallen, the control circuit switches back to the ignition time point for the idle state. The switchover to the ignition time point for the acceleration state remains without effect for the operation of the engine in idle because, in the idle state, two to three crankshaft revolutions without ignition usually occur in response to a successful ignition.

If, in contrast, after the ignition switchover to the acceleration state, a combustion and therefore an increase in rpm is determined also in the following crankshaft revolution, then the acceleration state is actually present. The engine accelerates robustly and rapidly from the idle range to the maximum rpm.

The control circuit is so configured in accordance with the invention that the acceleration state is assumed for each successful combustion and therefore the ignition time point is switched over to the acceleration state. If the combustion remains absent in the following revolution because the engine continues to be at idle, this switchover is again cancelled. Each successful combustion during idle thereby leads to a switchover of the ignition time point to the acceleration state. If the subsequent combustion is absent, that is, a further rpm increase does not occur or the rpm even falls, there is a switching back to the ignition time point for the idle state.

It can be advantageous to use the gradient of the idle rpm curve as an operating parameter for switching over the ignition time point.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
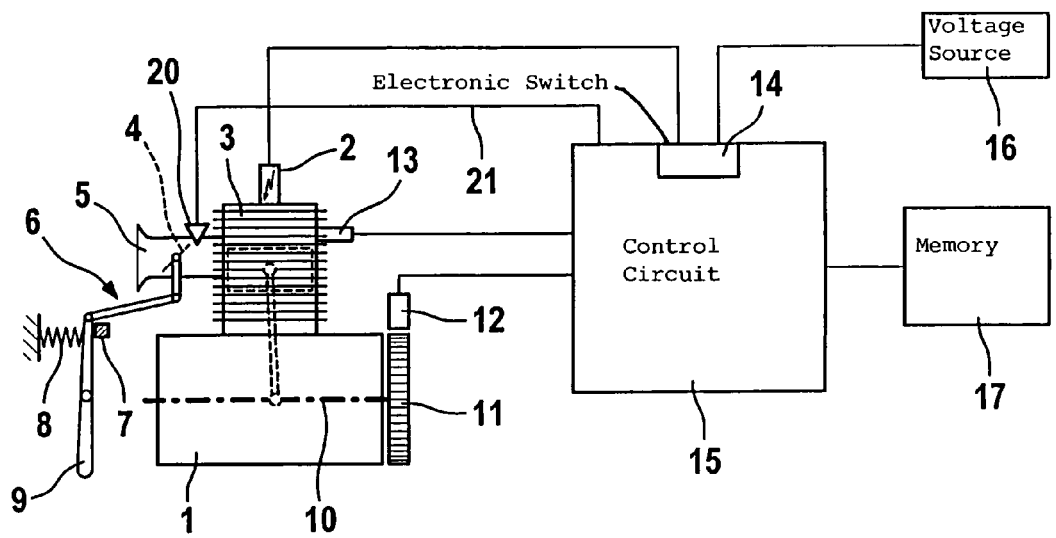
FIG. 1 is a schematic showing the configuration of an ignition circuit of the invention on an internal combustion engine which can be a two-stroke engine or a four-stroke engine; and, FIG. 2 is a diagram showing the idle rpm plotted against the number of crankshaft revolutions.

In the embodiment shown, a two-stroke engine 1 is shown which can be mounted in a portable handheld work apparatus such as a motor-driven chain saw, brushcutter, cutoff machine or the like. The ignition circuit of the invention is basically usable for air-cooled or water-cooled internal combustion engines.

The air-cooled cylinder 3 in the embodiment has an intake channel 5 having a carburetor and a throttle flap 4 which can be actuated by a throttle lever 9 via a linkage 6 in order to change the engine rpm. In the idle position shown, the throttle lever 9 lies against a stop 7 under the action of a spring 8.

A reciprocating piston is provided in the cylinder and this piston drives a crankshaft 10 via a connecting rod. A pulse transducer wheel 11 rotates with the crankshaft 10 of the engine 1. Marks provided on the outer periphery of the pulse transducer wheel 11 generate pulses in an assigned sensor 12 which pulses are supplied to the control circuit 15 as an rpm data signal. The marks on the pulse transducer wheel 11 are arranged in such a manner that at least, per crankshaft revolution, a signal. The marks on the pulse transducer wheel 11 are position, is generated in the pulse sensor 12 wherefrom the control circuit 15 can recognize the instantaneous rotational position of the crankshaft 10. Preferably, the marks are arranged over the periphery of the pulse transducer wheel 11 at different distances so that the angular position of the crankshaft 10 is directly detectable from the spacing of the pulses of the sensor 12.

The control circuit 15 is configured as an electronic circuit and is preferably a microprocessor which processes the signals of the pulse sensor 12 and correspondingly controls an electronic switch 14 which connects a spark plug 2 arranged on the cylinder 3 to a voltage source 16 for generating an ignition spark outputted in the combustion chamber. It can be advantageous to announce additional operating parameters to the control circuit 15 such as the cylinder temperature. For this purpose, a temperature sensor 13, which is mounted on the cylinder 3, can be provided.

The microprocessor in the control circuit 15 operates in accordance with a pregiven sequence diagram. A plurality of operating parameters of the engine 1 can be processed to determine the ignition time point. The microprocessor, that is, the control circuit 15 simultaneously limits the maximum rpm of the engine after exceeding an end rpm, for example, by suppressing an ignition spark.

The microprocessor further detects whether the engine is running in idle and whether the engine is being accelerated out of idle by the operator. For this purpose, an ignition characteristic field can be provided which is, for example, stored in a memory 17 which is connected to the control circuit 15. In the memory 17, for the range of the idle rpm, an ignition time point for the idle state is made available for each instantaneous actual rpm and, for the same rpm, an ignition time point for the acceleration state is made available. The ignition circuit 15 sets, in dependence upon the operating state of the engine, either the ignition time point for the idle state or the ignition time point for the acceleration state if an acceleration state is determined.

The method of the invention will now be explained with reference to the course of the idle rpm in a two-stroke engine in accordance with the diagram of FIG. 2.

Figure 2:
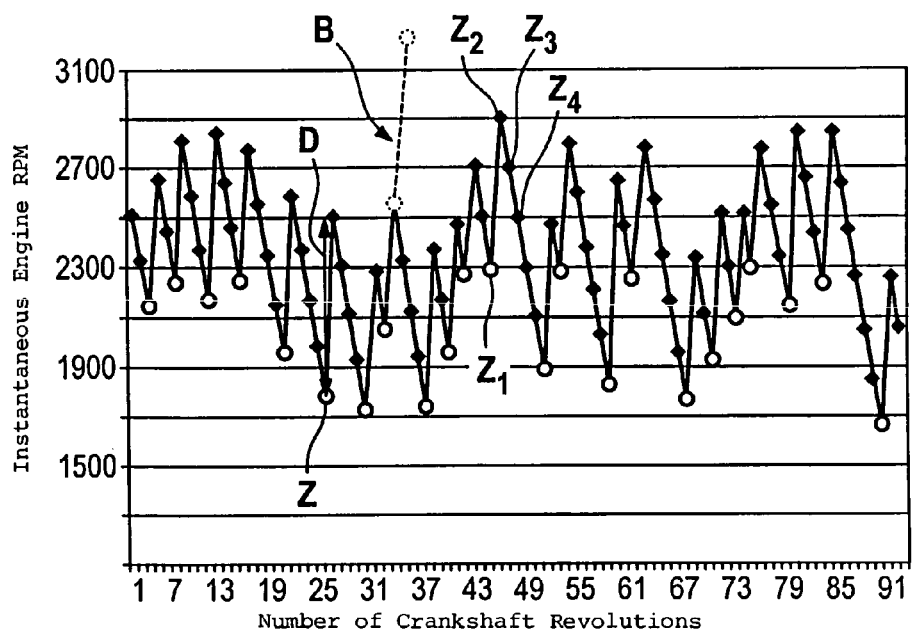

In a two-stroke engine, an ignition occurs in the idle state for each crankshaft revolution and this is shown by the points in the curve of FIG. 2. The number of crankshaft revolutions is shown along the x-axis while the instantaneous rpm is given along the y-axis. If the mixture in the combustion chamber of the engine ignites at time point Z in the idle state, then the rpm experiences a jump D from, for example, approximately 500 revolutions. This rpm jump is detected within a crankshaft revolution and can be evaluated by the control circuit 15. If, for example, at time point $Z_1$, an ignition takes place and if an rpm jump of approximately 600 revolutions is assumed during the following crankshaft revolution, then an rpm of approximately 2,900 revolutions is present at the next time point $Z_2$.

It was determined that at idle, even for a triggering of an ignition spark for each crankshaft revolution, an ignition of the mixture in the combustion chamber does not take place regularly. If the ignition takes place, for example, at ignition time point $Z_1$ and the crankshaft of the engine experiences an rpm jump of approximately 600 revolutions per minute in the following revolution, then, notwithstanding the ignition spark, the ignition does not take place at ignition time point $Z_2$. The same applies for the following revolution at ignition time point $Z_3$ as well as in the next following ignition time point $Z_4$. This has the consequence that, after the rpm jump, the rpm again falls off significantly until a renewed ignition of the mixture in the combustion chamber takes place and an rpm jump again occurs.

The ignition circuit 15 is operated in accordance with the invention so that, for a two-stroke engine, the rpm change is determined over one crankshaft revolution so that from crankshaft revolution to crankshaft revolution, the control circuit evaluates the actual rpms occurring. In a four-stroke engine, this would occur over two crankshaft revolutions because one ignition takes place every two revolutions in a four-stroke engine.

Because of the monitoring of the idle rpm, the control circuit 15 detects an ignition immediately based on the rpm jumps. Independently of the actual conditions at the engine, the control circuit switches over directly to an ignition time point for the acceleration state when detecting an rpm jump. This ignition time point is stored in the characteristic field memory 17 at the then-present actual rpm.

In the subsequent crankshaft revolution, the control circuit ignites at the ignition time point for the acceleration state. If the operator has not depressed the throttle, that is, idle is still present, the shift of the ignition time point in the "advance" direction then has no effect on the rpm. In the idle state, no ignition takes place because of the non-ignitable mixture in the combustion chamber so that the rpm drops. This rpm drop during one crankshaft revolution is, in turn, detected by the control circuit 15 and, because of the drop of the rpm, there is a switch back to the time point for the idle state. In the following two to three crankshaft revolutions, an ignition is absent because of the idle conditions even though an ignition spark is triggered. Only after approximately three to four crankshaft revolutions has a sufficient ignitable mixture adjusted in the combustion chamber so that a combustion takes place with the triggering of the ignition spark and the crankshaft rotates with acceleration. This is, in turn, determined by the control circuit as an rpm increase and, for the next crankshaft revolution, there is again a switchover to the ignition time point for the acceleration state.

If, in contrast, the operator has depressed the throttle, then an ignition again occurs in the subsequent crankshaft revolution in response to the first ignition since, because of the other position of the throttle flap, a sufficient air/fuel mixture is inducted over a crankshaft revolution in order to make an ignitable mixture available in the combustion chamber. A combustion takes place again so that the rpm increases as shown by the broken line in the curve branch B. Because of the open throttle flap, an ignition takes place now with each crankshaft revolution so that the engine runs up robustly and rapidly. An rpm increase is determined by the control circuit 15 each time from crankshaft revolution to crankshaft revolution. For this reason, the ignition switchover to the ignition time point for the acceleration state is maintained until the rpm lies outside of the idle range and the ignition is switched over to the load operation of the engine.

For a switchover of the ignition time point to the acceleration state, the control circuit 15 can, at the same time or correspondingly delayed, introduce an additional fuel quantity into the intake channel 5. For this purpose, a controlled fuel nozzle 20 is connected to the control circuit 15 via a control line 21.

With the switchover to the acceleration state, the control circuit 15 can also shift additional operating parameters of the engine to an optimal acceleration.

It is understood that the foregoing description is that of the preferred embodiments of the invention and that various changes and modifications may be made thereto without departing from the spirit and scope of the invention as defined in the appended claims.

What is claimed is:

1. An ignition circuit for an internal combustion engine including an engine in a portable handheld work apparatus, the engine having operating parameters and including a crankshaft which rotates through a crankshaft angle, the ignition circuit comprising:

a spark plug;
a voltage source;
an ignition switch connecting said spark plug to said voltage source;
an electronic control circuit for actuating said ignition switch to close the same in dependence upon said crankshaft angle and at least one of said operating parameters and to trigger an ignition spark per revolution of said crankshaft;
said control circuit functioning to make a first ignition time point available for an idle state and a second time point for an acceleration state at one and the same rpm of said engine;
said control circuit functioning to monitor the idle rpm and switching over to said second time point for said acceleration state when there is an rpm increase during idle to thereby effect a rapid acceleration out of idle and, after the ignition switchover to said acceleration state, continuing to monitor the rpm and, when there is an absence of a further increase in rpm or when there is a drop in said rpm, said control circuit switching back to said first ignition time point for the idle state.

2. The ignition circuit of claim 1, wherein a gradient of the rpm is used as said operating parameter for switching over said ignition time point.

3. The ignition circuit of claim 2, wherein said engine is a two-stroke engine and said rpm change is determined over at least one revolution of said crankshaft.

4. The ignition circuit of claim 2, wherein said engine is a four-stroke engine and said rpm change is determined over at least two revolutions of said crankshaft.

5. The ignition circuit of claim 1, wherein an additional quantity of fuel is introduced into the intake channel when switching over to the acceleration state.

6. The ignition circuit of claim 1, wherein additional operating parameters of said engine are adjusted to an optimal acceleration with the switchover to the acceleration state.

* * * * *

UNITED STATES PATENT AND TRADEMARK OFFICE
CERTIFICATE OF CORRECTION

PATENT NO. : 6,976,472 B2
DATED : December 20, 2005
INVENTOR(S) : Hans Nickel

It is certified that error appears in the above-identified patent and that said Letters Patent is hereby corrected as shown below:

<u>Column 3,</u>
Lines 35 and 36, delete "signal. The marks on the pulse transducer wheel 11 are" and substitute -- signal, which is specific to the crankshaft --.

Signed and Sealed this

Fourteenth Day of February, 2006

JON W. DUDAS
*Director of the United States Patent and Trademark Office*